US012789140B2

(12) United States Patent
Uttinger et al.

(10) Patent No.: US 12,789,140 B2
(45) Date of Patent: Nov. 10, 2026

(54) OZONE SCRUBBER AND OZONE SCRUBBING METHOD

(71) Applicant: Vigie Groupe, Paris (FR)

(72) Inventors: Walter Uttinger, Winterthur (CH); Bruno Heiniger, Boll (CH); Amanda Murillo, Winterthur (CH); Luca Ramoino, Uster (CH)

(73) Assignee: Vigie Groupe, Paris (FR)

( * ) Notice: Subject to any disclaimer, the term of this patent is extended or adjusted under 35 U.S.C. 154(b) by 598 days.

(21) Appl. No.: 18/246,323

(22) PCT Filed: Sep. 22, 2021

(86) PCT No.: PCT/EP2021/076018
§ 371 (c)(1),
(2) Date: Mar. 22, 2023

(87) PCT Pub. No.: WO2022/063807
PCT Pub. Date: Mar. 31, 2022

(65) Prior Publication Data

US 2023/0364555 A1 Nov. 16, 2023

(30) Foreign Application Priority Data

Sep. 22, 2020 (EP) .................................... 20306074

(51) Int. Cl.
*B01D 53/66* (2006.01)
*B01D 53/14* (2006.01)
(Continued)

(52) U.S. Cl.
CPC ......... *B01D 53/66* (2013.01); *B01D 53/1412* (2013.01); *B01D 53/1493* (2013.01);
(Continued)

(58) Field of Classification Search
None
See application file for complete search history.

(56) References Cited

U.S. PATENT DOCUMENTS

2007/0110652 A1 5/2007 You et al.

FOREIGN PATENT DOCUMENTS

CN 208229631 U 12/2018
JP S50 84480 A 7/1975
(Continued)

OTHER PUBLICATIONS

"Safety Data Sheet for Sodium Bisulfite." Hill Brothers Chemical Co. (2016). Viewed online on Jan. 24, 2026 at https://hillbrothers.com/pdf/downloads/msds/sds/sodium-bisulfite-sds.pdf.*
(Continued)

*Primary Examiner* — Daniel Berns
(74) *Attorney, Agent, or Firm* — Conley Rose, P.C.

(57) ABSTRACT

Method to scrub ozone in an ozone scrubber comprising a gas-liquid contactor adapted to bring a reducing liquid in contact with an inlet gas comprising ozone, the method comprising the steps of:

supplying the inlet gas to the gas-liquid contactor, supplying fresh reducing liquid to the gas-liquid contactor, the fresh reducing liquid comprising an aqueous solution of a reducing agent, scrubbing ozone of the inlet gas by a reduction reaction with the reducing liquid under acidic pH conditions.

9 Claims, 1 Drawing Sheet

(51) Int. Cl.

| | |
|---|---|
| ***B01D 53/18*** | (2006.01) |
| ***B01D 53/34*** | (2006.01) |
| ***B01D 53/78*** | (2006.01) |

(52) U.S. Cl.

CPC ........... *B01D 53/18* (2013.01); *B01D 53/346* (2013.01); *B01D 53/78* (2013.01); *B01D 2251/304* (2013.01); *B01D 2251/306* (2013.01); *B01D 2257/106* (2013.01)

(56) References Cited

FOREIGN PATENT DOCUMENTS

| | | | |
|---|---|---|---|
| JP | S 51-003368 | A | 1/1976 |
| JP | S 51-081779 | A | 7/1976 |
| JP | S 52-107267 | A | 9/1977 |
| JP | S54 152146 | U | 10/1979 |
| JP | H 02-164725 | A | 6/1990 |
| JP | H 03-005324 | A | 11/1991 |
| WO | 2009087265 | A2 | 7/2009 |
| WO | 2022063807 | A1 | 3/2022 |

OTHER PUBLICATIONS

"Safety Data Sheet: Sodium Bisulfate." Integra Chemical Co. (2015). Viewed online on Jan. 24, 2026 at https://www.integraclear.com/msds/S284_26353_101.pdf.*

Foreign Communication from a Related Counterpart Application, International Search Report and Written Opinion dated Dec. 10, 2021, International Application No. PCT/EP2021/076018 filed on Sep. 22, 2021.

Foreign Communication from a Related Counterpart Application, Extended European Search Report dated Mar. 17, 2021, European Application No. 20306074.4 filed on Sep. 22, 2020.

Foreign Communication from a Related Counterpart Application, Japanese Notice of Reasons for Refusal dated Jun. 24, 2025, Japanese Application No. JP 2023-518543 filed on Sep. 22, 2021.

Foreign Communication from a Related Counterpart Application, Japanese Decision of Refusal dated Jan. 19, 2026, Japanese Application No. JP 2023-518543 filed on Sep. 22, 2021.

Foreign Communication from a Related Counterpart Application, Chinese First Office Action dated Oct. 25, 2025, Chinese Application No. CN 202180065011 filed on Sep. 22, 2021.

* cited by examiner

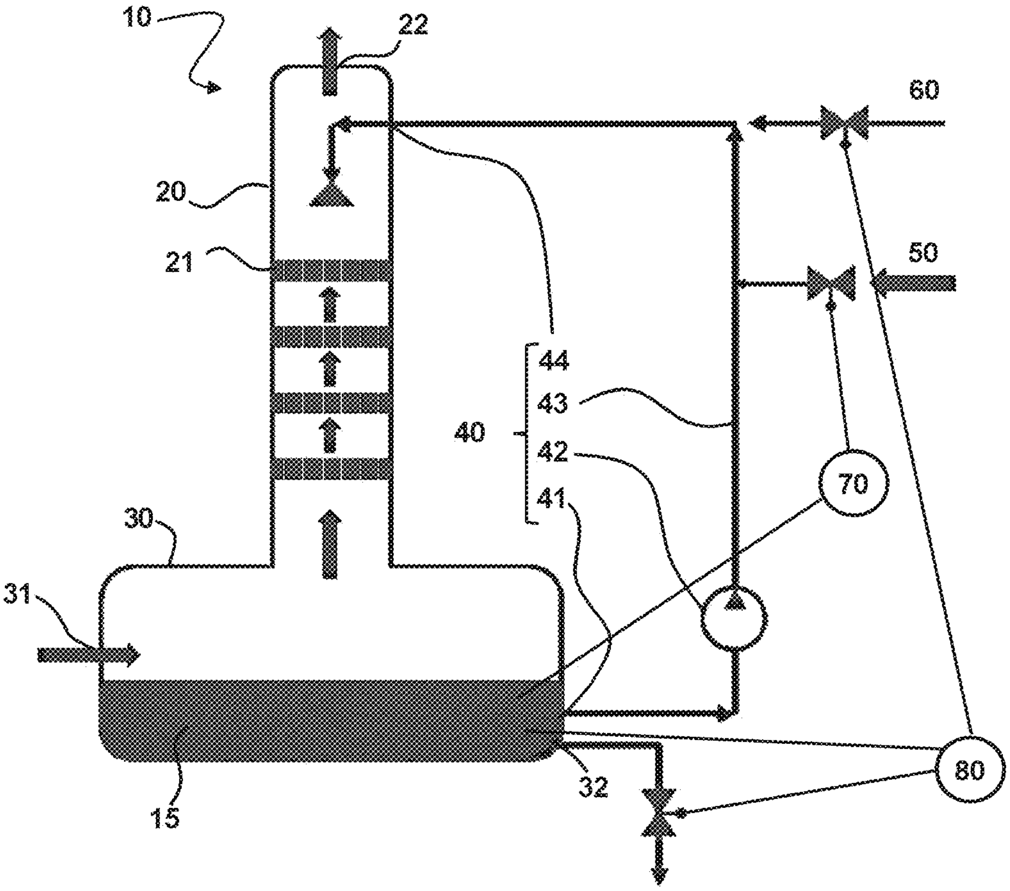
10
22
60
20
50
21
44
43
40
42
41
70
30
31
80
32
15

OZONE SCRUBBER AND OZONE SCRUBBING METHOD

CROSS-REFERENCE TO RELATED APPLICATIONS

The present application is a filing under 35 U.S.C. 371 as the National Stage of International Application No. PCT/EP2021/076018, filed Sep. 22, 2021, entitled "OZONE SCRUBBER AND OZONE SCRUBBING METHOD," which claims priority to European Application No. 20306074.4 filed with the European Patent Office on Sep. 22, 2020, both of which are incorporated herein by reference in their entirety for all purposes.

FIELD OF THE INVENTION

The present invention relates to a device and a method in order to scrub or destroy ozone present in a gas flow.

BACKGROUND OF THE INVENTION

Ozone ($O_3$) is known for its various properties of disinfection, pest killer, cleaning and bleaching. It is thus widely used among numerous industries, for example in the fields of water treatment, agriculture, industrial food, healthcare and paper production.

Ozone is also considered as a pollutant in the biosphere and must be destroyed before release to the environment. For that purpose, thermal ozone destructors and catalytic ozone destructors have been proposed.

Thermal ozone destructors rely on the fact that ozone is unstable and its half-life time decreases very quickly when temperature increases. A gas flow containing residual ozone to be destroyed is passed through a reactor with a heater. The gas is heated up to some few hundred degrees Celsius so that ozone half lifetime becomes very short. The reactor is designed so that the gas flow is kept a fairly long time within the reactor, with respect to the ozone half lifetime at the operating temperature, and ozone is abated.

This method has the drawback to be energetically expensive since the whole gas flow has to be heated up even if the concentration of residual ozone in the gas flow is quite low. To reduce energy consumption, it is possible to use a heat recovery system, i.e. a heat exchanger transferring heat between the hot gas at the destructor outlet and the cold gas at the destructor inlet. Such a solution is very effective to reduce energy operational costs, but the heat exchanger is relatively expensive and increases the investment costs of the whole ozone solution (ozone producer and ozone destructor). Furthermore, other chemicals may be present in the ozone inlet gas and can damage the thermal destructor, for example causing corrosion.

In catalytic ozone destructors, a reactor is filled with a catalyst in the form of granulates. The ozone inlet gas is flown through the catalyst granulates which induce the ozone destruction. The operational costs of such a catalytic ozone destructor are low compared to the ones of a thermal ozone destructor.

However, catalytic ozone destructors have the drawback of using catalysts that may be sensitive to several chemicals (e.g. sulphur compounds) and can be easily poisoned, which may lead to frequent replacements of the catalyst and thus high operational costs and high environmental impact. For this reason, catalytic ozone destructors cannot be used in all industrial processes.

Finally, document WO 93/18226 discloses a process of destroying ozone comprising the step of scrubbing the gaseous stream with an alkaline liquid containing dissolved organic material, the alkaline liquid being available for example from a paper production process.

However, the present inventors determined that the selectivity of the reaction between the alkaline liquid and ozone is not very important with regard to the competing reaction of the alkaline liquid with oxygen, so that the above prior art process fails to deliver an efficient destruction of ozone and a very low ozone content into the process off gas.

There is thus a need for an ozone destructor or ozone scrubber that can process an industrial gas containing ozone with high efficiency and low operational costs.

SUMMARY OF THE INVENTION

This objective is accomplished in a first aspect of the present invention by a method to scrub ozone in an ozone scrubber comprising a gas-liquid contactor adapted to bring a reducing liquid in contact with an inlet gas comprising ozone, the method comprising the steps of:

a) supplying the inlet gas to the gas-liquid contactor,
b) supplying fresh reducing liquid to the gas-liquid contactor, the fresh reducing liquid comprising an aqueous solution of a reducing agent,
c) scrubbing ozone of the inlet gas by a reduction reaction with the reducing liquid under acidic pH conditions.

The choice of acidic pH conditions allows a high destruction yield of ozone, i.e. a low consumption of reducing agent to destroy most or all the ozone of the inlet gas. The present method is thus cost-efficient. The acidic pH conditions may be obtained thanks to an acidic liquid supplied in the gas-liquid contactor and/or from an acidic reaction product of the reduction reaction. Heating can also be avoided and the reduction reaction can be performed at room temperature. For example, no catalyst is used in the gas liquid contactor. The above steps are preferably performed simultaneously, in a continuous process. Alternatively, a batch process can be considered. Finally, the fresh reducing liquid is preferably supplied countercurrent with regard to the inlet gas.

Advantageously, the reducing agent is selected so that the reduction reaction of the scrubbing step produces an acidic reaction product, the acidic reaction product contributing to at least a part of the acidic conditions.

Acidic pH conditions may thus be maintained in the gas-liquid contactor with a limited addition or without the addition of an acidic liquid or reagent. This contributes to the high ozone destruction yield and the high cost efficiency of the present method. Preferably, no other reagent than ozone and the reducing agent is added in the reduction reaction.

Advantageously, the reducing agent is based on a sulphur and/or phosphorous compound. Such reducing agents are readily available and may result in an acidic reaction product.

Advantageously, the reducing agent comprises sulphite, bisulphite, metabisulphite and/or thiosulfate. Such reducing agent may be comprised in waste liquids of industrial processes such as paper pulp manufacturing, which further contributes to the cost-efficiency of the present process. Preferably, the reducing agent is or comprises sulphite.

Advantageously, the present method comprises a step of recirculating at least a part of the reducing liquid throughout the gas-liquid contactor during the scrubbing step. Consequently, the acidic reaction product may contribute to the acidic reaction conditions more efficiently, which is favourable in terms of ozone destruction yield and cost-efficiency.

Advantageously, a step of maintaining acidic pH conditions in the gas-liquid contactor by controlling the flow rate of fresh reducing liquid in the step of supplying fresh reducing liquid into the gas-liquid contactor. Consequently, the acidic reaction product may contribute to the acidic reaction conditions more efficiently, which is favourable in terms of ozone-destruction yield and cost-efficiency. For example, pH could be equal or less than 6, preferably equal or less than 5 or preferably less than 4 and again preferably less than 3. The pH could more than zero or equal or more than 1 or 2.

Advantageously, a constant pH is maintained during the step of maintaining acidic pH condition, which provides the best results in term of ozone destruction yield. For example, a constant pH could be 2.5.

Advantageously, the acidic reaction product is sulphuric acid and/or sodium bisulfate. Such acidic reaction products can be easily obtained, in particular from a reducing liquid comprising sulphite, bisulphite, metabisulphite and/or thiosulfate. They can contribute to the acidic pH conditions of the reduction reaction without significant side reactions. A pH of at most 4, at most 3 and preferably 2.5 can be maintained in the reduction reaction.

Advantageously, an oxidized reaction product is further produced by the reduction reaction, the method further comprising:

d) temporally storing at least part of the reducing liquid in a tank or a tank portion of the gas-liquid contactor, after the reduction reaction i.e. after circulation in the gas-liquid contactor, e) supplying fresh water into said tank and/or into the gas-liquid contactor, f) draining part of the reducing liquid of said tank or tank portion, g) controlling a concentration of the oxidized reaction product in the reducing liquid by acting on the flow rate of the supplied water and/or of the drained reducing liquid.

Such additional features may allow to prevent precipitation of the oxidized reaction product in the ozone scrubber and thus to sustain continuous ozone destruction. The oxidized reaction product may be formed from the acidic reaction product or may be in an equilibrium with the acidic reaction product. For example, the oxidized reaction product is sodium sulphate. Water such as tap, industrial or fresh water may supplied simultaneously with the reducing liquid.

A second aspect of the present invention is a ozone scrubber, adapted to perform the method to scrub ozone according to the first aspect of the invention, the ozone scrubber comprising:

a) a gas-liquid contactor, b) a gas inlet supply adapted to supply said inlet gas, c) a fresh liquid supply adapted to supply said fresh reducing liquid;

wherein the ozone scrubber comprises recirculation means configured to recirculate at least part of the reducing liquid throughout the gas-liquid contactor.

Such a ozone scrubber is particularly adapted to the present method and allows to obtain a high yield of ozone destruction and a high cost-efficiency.

Advantageously, the ozone scrubber further comprises a pH controller configured to maintain acidic pH conditions in the gas-liquid contactor and/or in the recirculation means by controlling the flow rate of the fresh liquid supply. In other words, the pH controller may maintain constant acidic pH conditions during the reduction reaction.

Advantageously, the ozone scrubber further comprises:

d) a tank or a tank portion of the gas-liquid contactor adapted to temporary store reducing liquid after circulation in the gas-liquid contactor and before recirculation, e) a water supply adapted to supply water into the gas-liquid contactor or into the tank, f) a liquid drain adapted to evacuate part of the reducing liquid from the tank or the tank portion and g) a reaction product controller adapted to control the concentration of an oxidized reaction product in the reducing liquid by controlling the flow rate of the supplied water and/or by controlling the flow rate of the drained reducing liquid.

Advantageously, the gas-liquid contactor is a plate column. Such a gas-liquid contactor allows an optimized ozone destruction. Alternatively, other gas-liquid contactors may be used.

BRIEF DESCRIPTION OF THE DRAWINGS

Further advantages and preferred embodiments of the present invention will become apparent from the following detailed description and drawing, in which:

FIG. 1 is a schematic view of an ozone scrubber according to an aspect of the present invention.

DETAILED DESCRIPTION

The present ozone scrubber and present ozone scrubbing method are intended to scrub or destroy ozone in an inlet gas, for example outputted from an industrial process such as water treatment, food disinfection or paper production.

Ozone Scrubber

With reference to FIG. 1, an ozone scrubber 10 according to an embodiment of the present invention comprises a gas-liquid contactor 20, for example in the form of a plate column provided with perforated plates 21. The gas-liquid contactor 20 is provided with a top portion comprising a gas outlet 22. The gas-liquid contactor 20 is connected on its base portion with a tank 30. The tank 30 is provided with a gas inlet supply 31 adapted to supply an inlet gas comprising ozone, a liquid drain 32 adapted to drain or evacuate the liquid from the tank 30 and a liquid recirculation outlet 41.

The recirculation outlet 41 is fluidly connected to pumping means such as a pump 42 adapted to output reducing liquid 15 into recirculation tubing 43 toward a liquid supply 44 provided in the gas-liquid contactor 20. The liquid supply 44 is preferably arranged for supplying liquid in a portion of the gas-liquid contactor opposite from the portion connected to the tank 30 or at least opposite to the gas inlet supply 31. In the preferable embodiment of FIG. 1, the gas inlet supply is arranged at a bottom portion of the ozone scrubber 10 in the tank 30 and the liquid supply 44 is arranged in a top portion of the ozone scrubber 10 i.e. in a top portion of the gas-liquid contactor 20. The recirculation outlet 41, the pump 42, the recirculation tubing 43 and the liquid supply 44 define recirculation means 40.

Consequently, in the preferred embodiment of FIG. 1, the inlet gas containing ozone moves from the tank 30 up toward the top portion of the gas-liquid contactor 20 through the perforated plates 21 according to the upward arrows of FIG. 1. The reducing liquid 15 moves down according to the downward arrow of FIG. 1 and its downward flow is limited by the perforated plates 21.

Further, a fresh liquid supply 50 and a water supply 60 are provided on the recirculation tubing 43. The fresh liquid supply 50 is adapted to supply fresh reducing liquid chosen so that an acidic reaction product is produced by reaction with ozone. The water supply is adapted to provide water to the ozone scrubber 10, for example fresh water or aqueous outflow compatible with the reaction performed in the gas-liquid supply, for example comprising acidic compounds.

Further, the present ozone scrubber may comprise a pH controller 70 and a reaction product controller 80. The pH controller 70 is connected to a valve of the fresh liquid supply 50 and to one or several pH sensors provided in the tank 30 in FIG. 1. Alternatively or in combination, it may also be connected to one or several pH sensors provided in the gas-liquid contactor 20 and/or in the recirculation tubing 43 and is programmed to at least maintain an acidic pH, for example below 6.5 and preferably lower.

The reaction product controller 80 may be connected to a valve of the water supply 60, to a valve of the liquid drain 32 and to an oxidized reaction product sensor adapted to detect or measure the concentration of an oxidized reaction product in the reducing liquid 15. The reaction product sensor is for example a redox sensor and may be provided into the tank 30 as in FIG. 1 and/or into the gas-liquid contactor 20 or the recirculation tubing 43.

The pump 42 may be any kind of pump adapted to move liquid, in particular acidic and/or reducing liquids. This includes centrifugal pump, peristatic pumps, gear pumps, screw pumps and roots lobe pumps. The pump speed and/or the flow of reducing liquid recirculated thanks to the pump 42 may be controlled, for example on the basis of the gas inlet flow rate at the gas inlet 31 and/or on the basis of the ozone concentration at the gas outlet 22. Preferably, the ozone concentration at the gas outlet 22 may be 100 ppb or less, according to local regulations.

In other embodiments, the fresh liquid supply may be connected to a fresh liquid inlet provided on the gas-liquid contactor, for example on the top portion and/or on the tank. Similarly, the water supply may be connected to the fresh liquid supply or to a water supply inlet provided on the gas-liquid contactor, for example on the top portion and/or on the tank.

The gas-liquid contactor 20 in FIG. 1 is a plated column but any type of gas-liquid contactor may be used. For example, the gas-liquid contactor can be a falling-film column, a packed column, a bubble column, a spray tower, a gas-liquid agitated vessel, a rotating disc contactor or a venturi tube.

Depending on the type of gas-liquid contactor and the specific process, the tank may be integrated in the gas-liquid contactor in the form of a tank portion. For example, the bottom portion of the gas-liquid contactor may be filled with reducing liquid, thus acting as a tank portion, and the recirculation outlet may be arranged on the tank portion of such a gas-liquid contactor. The liquid drain may also be arranged on the tank portion and/or could be a derivation of the recirculation outlet or the recirculation tubing. Finally, the gas inlet may also be provided on the tank portion or on a bottom portion of the gas-liquid contactor.

The present ozone scrubber 10 comprises all valves, tubing, sensors and safety means required by regulations and/or good manufacturing practices as known by the skilled person.

Ozone Scrubbing Method

An ozone scrubbing method using the ozone scrubber 10 is now disclosed. An inlet gas comprising ozone is supplied to the gas-liquid contactor 20, for example comprising between 5 and 15% of ozone, for example around 10% v/v. This inlet gas may come from an industrial process comprising ozone, for example for paper pulp manufacturing and must be destroyed before being released to the environment for safety and environmental reasons.

Fresh reducing liquid is supplied to the gas-liquid contactor 20. This fresh reducing liquid is preferably chosen so that an acidic reaction product is produced by reaction with ozone. For example, the fresh reducing liquid comprises one or several reducing agents that react with ozone in order to produce one or several acidic reaction products.

At least part of the reducing liquid 15 which is contained in the ozone scrubber 10 is recirculated throughout the gas-liquid contactor 20 after contact with the inlet gas. This recirculation may be performed by the recirculation means 40 and is intended to optimize the contact period between the inlet gas and the reducing liquid 15 and to provide acidic pH conditions in the gas-liquid contactor 20 and in the reducing liquid 15. The recirculation may contribute to maintain acidic pH conditions for the reduction reaction.

Further, acidic pH conditions may be maintained in the gas-liquid contactor by the pH controller 70 controlling the supply of fresh reducing liquid into the gas-liquid contactor. Indeed, the reducing liquid may not be acidic and may be neutral or basic so that it is preferable to regulate or control the flow rate of the fresh reducing liquid supply in order to maintain acidic pH conditions in the gas-liquid contactor (i.e. in the reducing liquid). Preferably, the fresh reducing liquid supply is controlled so that a constant acidic pH is maintained into the gas-liquid contactor.

An oxidized reaction product may be produced by the reduction reaction. This oxidized reaction product may be formed from the acidic reaction product and/or be in an equilibrium with the acidic reaction product. Alternatively, only the oxidized reaction product and no acidic reaction product may be formed. Preferably, the concentration of the oxidized reaction product may be controlled as follows.

At least part of the reducing liquid 15 is stored after reaction with ozone in the tank 30 or a tank portion of the gas-liquid contactor 20, for example before recirculating the reducing liquid 15 throughout the gas-liquid contactor 20.

Fresh water is supplied into the tank 30 or into the gas-liquid contactor 20 and part of the reducing liquid 15 is drained from the tank 30 or the tank portion of the gas-liquid contactor 20.

The concentration of the oxidized reaction product into the reducing liquid 15 is thus controlled by the reaction product controller 80 acting on the flow rate of the fresh water supply 60 and/or of the liquid drain 32. This allows to avoid undesired side reactions that may occur in the gas-liquid contactor 20 and/or precipitation of the oxidized reaction product(s).

Chemistry Details

Without being bound by any theory, ozone may be destroyed by the present method through its reduction into oxygen. The reducing agent may thus be oxidized and/or hydrolysed into the acidic reaction product.

The gas inlet comprising ozone usually also comprises oxygen, which is a powerful oxidant. The inventors determined that the selectivity of the reaction between the reducing agent and ozone versus the reaction between the reducing agent and oxygen is better in acidic conditions. In other words, the reducing agent reacts faster with ozone than with oxygen in acidic pH conditions.

For example, the reducing liquid comprise water as a solvent or at least a protic solvent such as an alcohol and the reducing agent(s) may be chosen among potassium or sodium sulphite ($Na_2SO_3$), potassium or sodium bisulphite ($NaHSO_3$), potassium or sodium metabisulphite ($Na_2S_2O_5$), potassium or sodium thiosulphate ($Na_2S_2O_3$), water-soluble organic phosphorus such as tris (2-carboxyethyl)phosphine, a cysteine salt, a nitrite salt such as potassium or sodium nitrite ($NaNO_2$), a water-soluble salt of ethylenediaminetetraacetic acid (EDTA salt thereof), a phosphinate and/or a phosphite.

Preferably, the reducing agent is or comprises a sulphur reducing agent such as potassium or sodium sulphite ($Na_2SO_3$), potassium or sodium bisulphite ($NaHSO_3$), potassium or sodium metabisulphite ($Na_2S_2O_5$), potassium or sodium thiosulphate ($Na_2S_2O_3$). Preferably, the reducing liquid comprises at least potassium or sodium sulphite ($Na_2SO_3$).

In the case of a reducing agent based on sulphite or bisulphite, the following equilibrium occurs in water between *sulphurous* acid, bisulphite and sulphite, respectively: $H_2O,SO_2 \leftrightarrow HSO_3^- \leftrightarrow SO_3^{2-}$.

Numerous reactions can occur between these reducing agents and ozone, the most significant reactions being as follows:

$$H_2O+SO_3^{2-}+O_3 \rightarrow SO_4^{2-}+H^+$$

$$H_2O+HSO_3^-+O_3 \rightarrow SO_4^{2-}+H^+$$

$$H_2O+H_2O,SO_2^{2-}+O_3 \rightarrow SO_4^{2-}+H^+$$

Consequently, the reaction of the reducing agent with ozone produces sulphuric acid and/or bisulfite as an acidic reaction product. The reducing liquid comprising a sulphur reducing agent may be neutral or alkaline before introduction into the gas-liquid contactor but becomes acidic thanks to the production of the acidic reaction product and the recirculation of the reducing liquid. Indeed, the more the reducing liquid is recirculated in the gas-liquid contactor, the more the acidic reaction product concentration increases in the reducing liquid and the more acidic becomes the reducing liquid, i.e. the more pH decreases.

This acidic reaction product, which is a side product of the reaction between the sulphur reducing agent and ozone, may thus be used in the present invention to promote acidic pH conditions in the gas-liquid contactor. In addition, an oxidized reaction product under the form of sodium sulphite may be formed from the acidic reaction product and/or from the reduction reaction. At it is known, such an oxidized reaction product may precipitate above a certain concentration in the reducing liquid.

Further, the inventors demonstrated that acidic reaction conditions in the gas-liquid contactor favour the reaction between the reducing agent and ozone with regard to the competing reaction with oxygen.

Experimental Trials

An ozone scrubber 10 as described above comprising a 10-plate column having a total volume of approximately 2 l was set up. The ozone scrubber was fed with a 200 l/h inlet gas comprising 180 g/m$^3$ of ozone under standard temperature and pressure at the gas inlet supply 31 and an aqueous sulphite solution of a concentration of 200 g/l and an alkaline pH of 8 to 10 at the fresh liquid supply 50. The pump 42 was turned on in order to perform recirculation of the reducing liquid at a flow rate of 25 l/h and a total volume of reducing liquid in the ozone scrubber 10 of 5 l. pH was controlled to different value thanks to controlling the flow rate of the reducing liquid at the fresh liquid supply 50. The concentration of the gas outlet was monitored to be below 100 ppb and the experiment was performed at room temperature.

The consumption of reducing agent was followed at different pH levels and the results are as follows:

| pH | 9 | 4 | 3 | 2.5 |
|---|---|---|---|---|
| Specific Consumption of sulphite in gram per gram of ozone | 18.7 | 10.6 | 6.7 | 4.8 |

Consequently, the lowest consumption of sulphite was obtained for the lowest pH, i.e. 2.5, while the alkaline conditions of pH=9 provides an important and inefficient consumption of sulphite.

The present invention thus allows to optimize the use of the reducing agent to destroy ozone and thus to limit the operational costs of the present ozone scrubbing process.

Although the present invention has been described and illustrated in detail, it is clearly understood that the same is by way of illustration and example only and is not to be taken by way of limitations, the scope of the present invention being limited only by the terms of the appended claims.

The invention claimed is:

1. Method to scrub ozone in an ozone scrubber comprising a gas-liquid contactor adapted to bring a reducing liquid in contact with an inlet gas comprising ozone, the method comprising the steps of:

supplying the inlet gas to the gas-liquid contactor, supplying fresh reducing liquid to the gas-liquid contactor, the fresh reducing liquid comprising an aqueous solution of a reducing agent, scrubbing ozone of the inlet gas by a reduction reaction with the reducing liquid under acidic pH conditions, wherein an oxidized reaction product is further produced by the reduction reaction, temporally storing at least part of the reducing liquid in a tank or a tank portion of the gas-liquid contactor, after the reduction reaction, supplying fresh water into said tank and/or into the gas-liquid contactor, draining part of the reducing liquid of said tank or tank portion, and controlling a concentration of the oxidized reaction product in the reducing liquid by acting on the flow rate of the supplied water and/or of the drained reducing liquid.

2. Method to scrub ozone according to claim 1, further comprising a step of recirculating at least a part of the reducing liquid throughout the gas-liquid contactor during the scrubbing step, wherein acidic pH conditions are maintained in the gas-liquid contactor by controlling a flow rate of the fresh reducing liquid supplied to the gas-liquid contactor.

3. Method to scrub ozone according to claim 1, wherein the reducing agent is based on a sulphur or phosphorous compound.

4. Method to scrub ozone according to claim 1, wherein the reducing agent comprises sulphite, bisulphite, metabisulphite and/or thiosulfate.

5. Method to scrub ozone according to claim 1, further comprising a step of recirculating at least a part of the reducing liquid throughout the gas-liquid contactor during the scrubbing step.

6. Method to scrub ozone according to claim 1, wherein the reducing agent is selected so that the reduction reaction of the scrubbing step produces an acidic reaction product, the acidic reaction product contributing to at least a part of the acidic conditions.

7. Method to scrub ozone according to claim 6, wherein the acidic reaction product is sulphuric acid and/or sodium bisulfate.

8. Method to scrub ozone according to claim 6, comprising a step of maintaining acidic pH conditions in the gas-liquid contactor by controlling the flow rate of fresh reducing liquid in the step of supplying fresh reducing liquid into the gas-liquid contactor.

9. Method to scrub ozone according to claim 8, wherein a constant pH is maintained during the step of maintaining acidic pH condition.

* * * * *